May 24, 1927.
J. C. HARRINGTON
1,630,178
BRAKE MECHANISM
Filed July 13, 1925    3 Sheets-Sheet 1
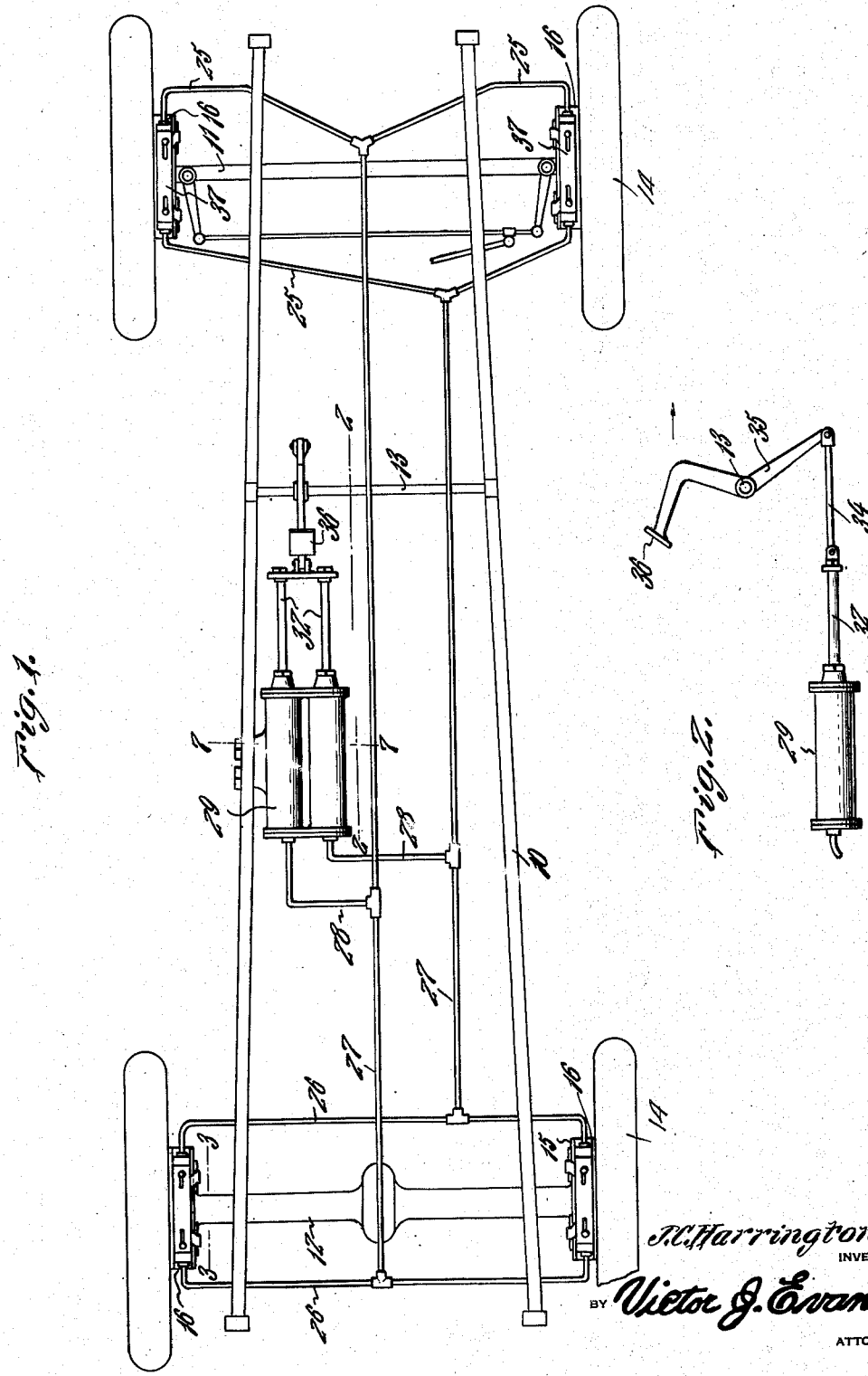

May 24, 1927. 1,630,178
J. C. HARRINGTON
BRAKE MECHANISM
Filed July 13, 1925 3 Sheets-Sheet 2
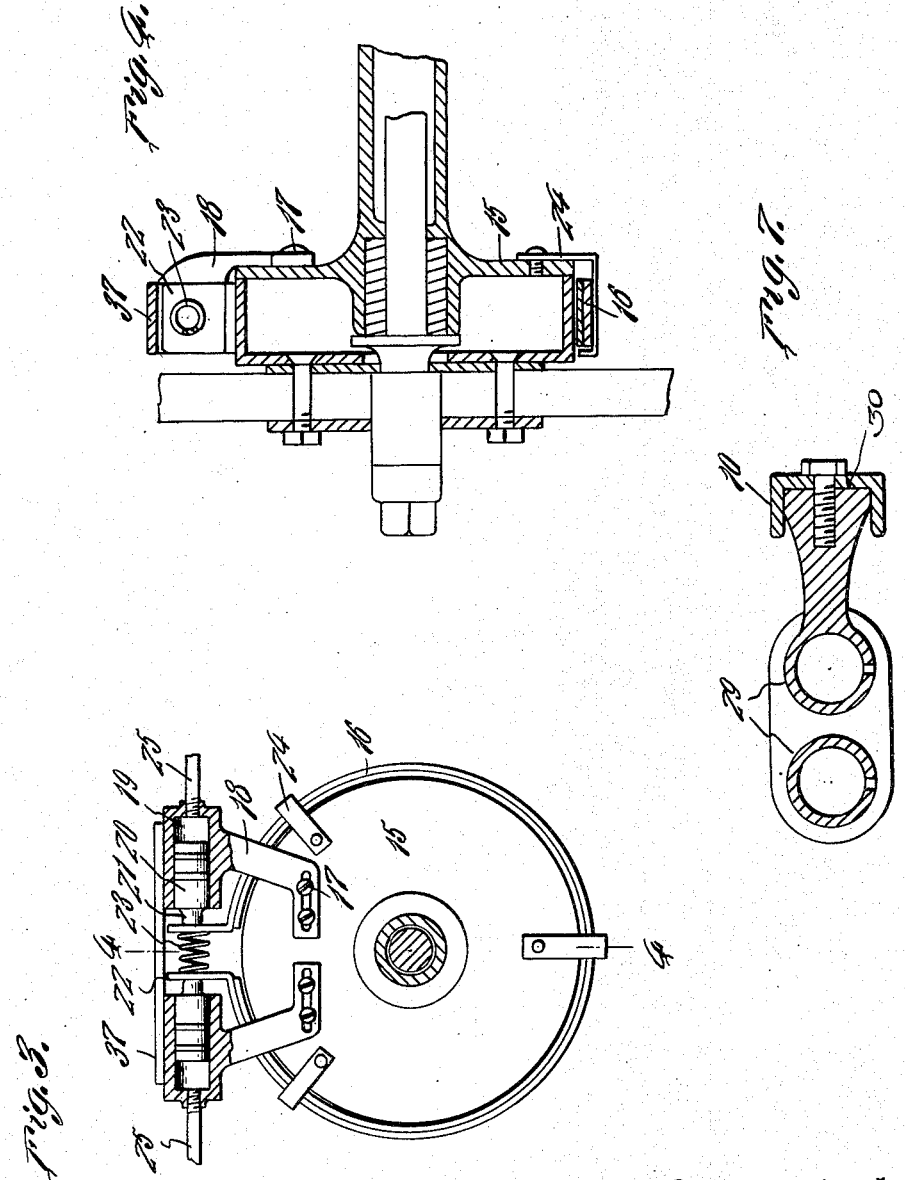
J. C. Harrington
INVENTOR
BY Victor J. Evans
ATTORNEY

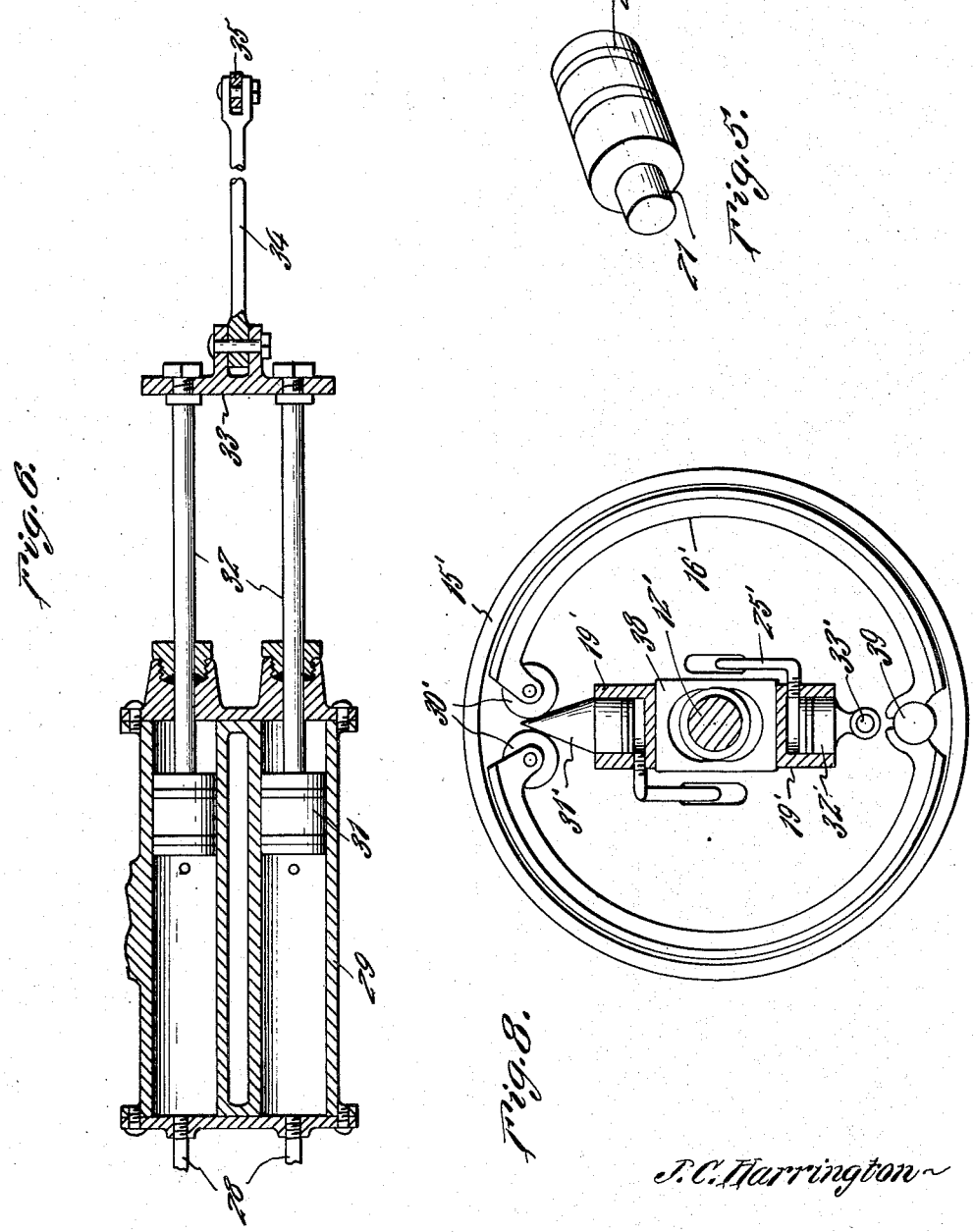

Patented May 24, 1927.

1,630,178

UNITED STATES PATENT OFFICE.

JOHN C. HARRINGTON, OF MANCHESTER DEPOT, VERMONT.

BRAKE MECHANISM.

Application filed July 13, 1925. Serial No. 43,340.

This invention relates to vehicle brakes especially adapted for use upon motor vehicles and has for an object the provision of a fluid operated brake mechanism which will provide equal braking power upon the brake drums in either direction; will insure equalization of braking power for two or more wheels and provide for safety by the simultaneous operation of a plurality of independent braking mechanisms, so that should one of the mechanisms fail, the other will act.

Another object of the invention is the provision of a brake mechanism in which the brake bands operate simultaneously in opposite directions and thus eliminate grabbing action of the brakes, in addition to automatically adjusting the bands to any irregular motion of the drums or wear upon the brake linings, no adjustment being necessary during the life of the linings.

A further object of the invention is the provision of a brake mechanism which is especially adapted for use upon all four wheels of the vehicle, the mechanism in no way interfering with the steering operation and providing for an equal distribution of braking power to all four of the wheels.

With the above and other objects in view, the invention further includes the following novel features and details of construction, to be hereinafter more fully described, illustrated in the accompanying drawings and pointed out in the appended claims.

In the drawings:—

Figure 1 is a plan view showing a portion of the chassis of an automobile with the invention applied.

Figure 2 is a fragmentary sectional view taken substantially on the line 2—2 of Figure 1.

Figure 3 is an enlarged sectional view taken substantially on the line 3—3 of Figure 1.

Figure 4 is a section on the line 4—4 of Figure 3 showing a fragmentary portion of a vehicle wheel.

Figure 5 is a detail perspective view of one of the pistons.

Figure 6 is a horizontal sectional view taken longitudinally through the compressors.

Figure 7 is a sectional view taken substantially on the line 7—7 of Figure 1.

Figure 8 is a view similar to Figure 3 showing a modified form of the invention.

Referring to the drawings in detail where-in like characters of reference denote corresponding parts, the reference character 10 indicates the frame of an automobile, 11 the front axle and 12 the rear axle, while 13 indicates a bar or shaft which connects the side bars of the frame 10.

The wheels of the vehicle which are indicated at 14 have secured thereto brake drums 15 and these drums as illustrated in Figures 1, 3 and 4 of the drawings are surrounded by brake bands 16, the drums and bands being applied to all four of the vehicle wheels. It is not the purpose of the present application however to limit the invention to four brakes as it will be apparent that it will operate two-wheel brakes in the same manner. As the construction of each of the four brakes is the same, a description of one will suffice, the one described being illustrated in detail in Figures 3 and 4 of the drawings. In these figures, the drum 15 has secured thereon as indicated at 17, arms 18, the securing means being of a character to permit of relative adjustment of these arms. At the outer ends of the arms 18 there are provided cylinders 19 which are arranged in axial alignment and whose opposed ends are open. Operating within the cylinders 19 are pistons 20 having extensions 21 at their outer ends and these extensions are adapted to engage outwardly disposed extremities 22 provided upon the ends of the brake bands 16. The ends of the brake band are yieldingly forced apart by means of a spring 23 so as to normally hold the band spaced from the drum. The drum carries band guides 24.

Communicating with the closed end of each cylinder 19 as shown at 25 is a tube or pipe 26, these pipes acting to connect the cylinders 19 of the front wheels and the cylinders 19 of the rear wheels as shown in Figure 1 of the drawings, while connecting one pipe 26 of each of the front and rear wheels is a pipe 27. These last mentioned pipes are connected by pipes 28 with compressors 29, the latter being secured to the frame 10 as shown at 30. These compressors include pistons 31 whose rods 32 extend outwardly through one end thereof and are connected by a crosshead 33, while this crosshead is connected by a link 34 with one end of a lever 35. This lever is pivotally mounted upon the rod or shaft 13 and is provided with a foot pedal 36.

It will be apparent from the foregoing description and accompanying drawings that when the pedal 36 is depressed, the pistons 31 will be moved inwardly so as to compress the air within the cylinders 29. The air thus compressed will be delivered through the pipes 26, 27 and 28 to their respective cylinders 19 and the pistons 20 within these cylinders will be forced in a direction toward one another to compress the springs 23 and move the bands 16 into gripping engagement with the brake drums. As both ends of the brake bands are simultaneously moved, an even engagement throughout the brake drum will be provided and as the air from the compressors 29 will be simultaneously delivered to the cylinders 19 of all of the brake bands, the brakes for all of the wheels will be evenly and simultaneously applied. As one of the compressors 29 delivers air to each of the brakes, the application of the brakes, while simultaneous, is also independent so that in the event of failure of one of the compressors or its particular braking mechanism, the other compressor and braking mechanism will operate.

The cylinders 19 may be connected in pairs by means of a connecting bar 37.

While the invention has been described in connection with an external contracting brake band, it is equally well adapted for internal bands as illustrated in Figure 8 of the drawings. In this figure the drum is indicated at 15' while the brake shoes are indicated at 16'. The axle 12' passes through a supporting block 38 which is movable with respect to the brake drum and carries opposed cylinders 19'. These cylinders are in communication with the air supply tubes or pipes 26 by means of pipes or tubes 25' so that when the compressors are operated air will be supplied to the cylinders. The brake shoes are supported at one end by a stud 39 and carry at their opposite ends rollers 30', the latter being adapted to be engaged by a wedge shaped piston 31' which is forced outwardly from one of the cylinders 19' by the compressed fluid. The other cylinder 19' has its piston 32' secured to the brake drum as indicated at 33' so that when air is supplied to the cylinders 19', the piston 32' which is relatively stationary will act to move the cylinders in the direction of the rollers 33', while the piston 31' will be moved independently outward The invention is susceptible of various changes in its form, proportions and minor details of construction and the right is herein reserved to make such changes as properly fall within the scope of the appended claims.

Having described the invention what is claimed is:—

1. In a fluid operated vehicle brake, brake drums fixed to the wheels of the vehicle, normally disengaged brake bands for said drums, fluid operated means at each end of the brake bands to close the bands to engage the drums, air compressors, means operatively associating one of the air compressors with one of the fluid operated means of each band and manually operated means common to all of the compressors to provide for their simultaneous operation.

2. In a fluid operated vehicle brake, brake drums fixed to the wheel of the vehicle, normally disengaged brake bands for said drums, fluid operated means including oppositely movable pistons engaging the ends of the brake bands to operate the latter and cause the bands to engage the drums, air compressors, means operatively associating one of the air compressors with one of the fluid operated means of each band and manually operated means common to all of the compressors to provide for their simultaneous operation.

3. In a fluid operated brake, a rotatable brake drum, a relatively stationary brake band normally disengaged from and surrounding the drum, spaced outwardly extending ends for the band, fluid operated means including oppositely movable pistons positioned upon opposite sides of the outwardly extending ends of the band, means to force the pistons relatively inward to contract the band and a spring positioned between spaced ends of said band to yieldingly resist contraction.

In testimony whereof I affix my signature.

JOHN C. HARRINGTON.